United States Patent
Ling et al.

(10) Patent No.: US 9,768,852 B2
(45) Date of Patent: Sep. 19, 2017

(54) TRANSCEIVER ARRAY

(71) Applicant: Maxlinear, Inc., Carlsbad, CA (US)

(72) Inventors: Curtis Ling, Carlsbad, CA (US); Sheng Ye, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 38 days.

(21) Appl. No.: 14/931,103

(22) Filed: Nov. 3, 2015

(65) Prior Publication Data

US 2016/0127027 A1 May 5, 2016

Related U.S. Application Data (60) Provisional application No. 62/074,122, filed on Nov. 3, 2014.

(51) Int. Cl.
| | |
|---|---|
| *H04B 17/00* | (2015.01) |
| *H04B 7/08* | (2006.01) |
| *H01Q 3/24* | (2006.01) |
| *H04B 10/40* | (2013.01) |
| *H04B 7/06* | (2006.01) |
| *H04B 17/12* | (2015.01) |

(52) U.S. Cl.
CPC ............... *H04B 7/086* (2013.01); *H01Q 3/24* (2013.01); *H04B 7/0617* (2013.01); *H04B 10/40* (2013.01); *H04B 17/0085* (2013.01); *H04B 17/12* (2015.01); *H04B 2201/709709* (2013.01)

(58) Field of Classification Search
CPC .. H04B 7/086; H04B 7/0617; H04B 17/0085; H04B 17/12; H04B 10/40; H04B 2201/709709; H01Q 3/24
USPC ........ 375/224, 228, 259, 260, 267, 295, 299
See application file for complete search history.

(56) References Cited

U.S. PATENT DOCUMENTS

| | | | | |
|---|---|---|---|---|
| 9,035,828 | B2 * | 5/2015 | O'Keeffe | H01Q 1/246 342/368 |
| 2016/0233942 | A1 * | 8/2016 | Ling | H04B 7/18517 |

* cited by examiner

*Primary Examiner* — Siu Lee
(74) *Attorney, Agent, or Firm* — McAndrews, Held & Malloy, Ltd.

(57) ABSTRACT

Each of a plurality of modules comprises a respective one of a plurality of antenna elements, and each of a subset of the plurality of modules comprising a respective one of a plurality of transceivers, wherein the plurality of modules are interconnected via one or more communication links. The circuitry may be operable to receive a calibration signal via the plurality of antenna elements, determine, for each one of the antenna elements, a time and/or phase of arrival of the calibration signal, calculate, based on the time and/or phase of arrival of the calibration signal at each of the plurality of antenna elements, electrical distances between the plurality of antenna elements on the one or more communication links, and calculate beamforming coefficients for use with the plurality of antenna elements based on the electrical distances.

20 Claims, 13 Drawing Sheets

TRANSCEIVER ARRAY

PRIORITY CLAIM

This application claims priority to the following application(s), each of which is hereby incorporated herein by reference:
U.S. provisional patent application 62/074,122 titled "Transceiver Array" filed on Nov. 3, 2014.

BACKGROUND

Limitations and disadvantages of conventional methods and systems for wireless access networks will become apparent to one of skill in the art, through comparison of such systems with some aspects of the present invention as set forth in the remainder of the present application with reference to the drawings.

BRIEF SUMMARY

Systems and methods are provided for a transceiver array for wireless access networks, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION

Figure 1:
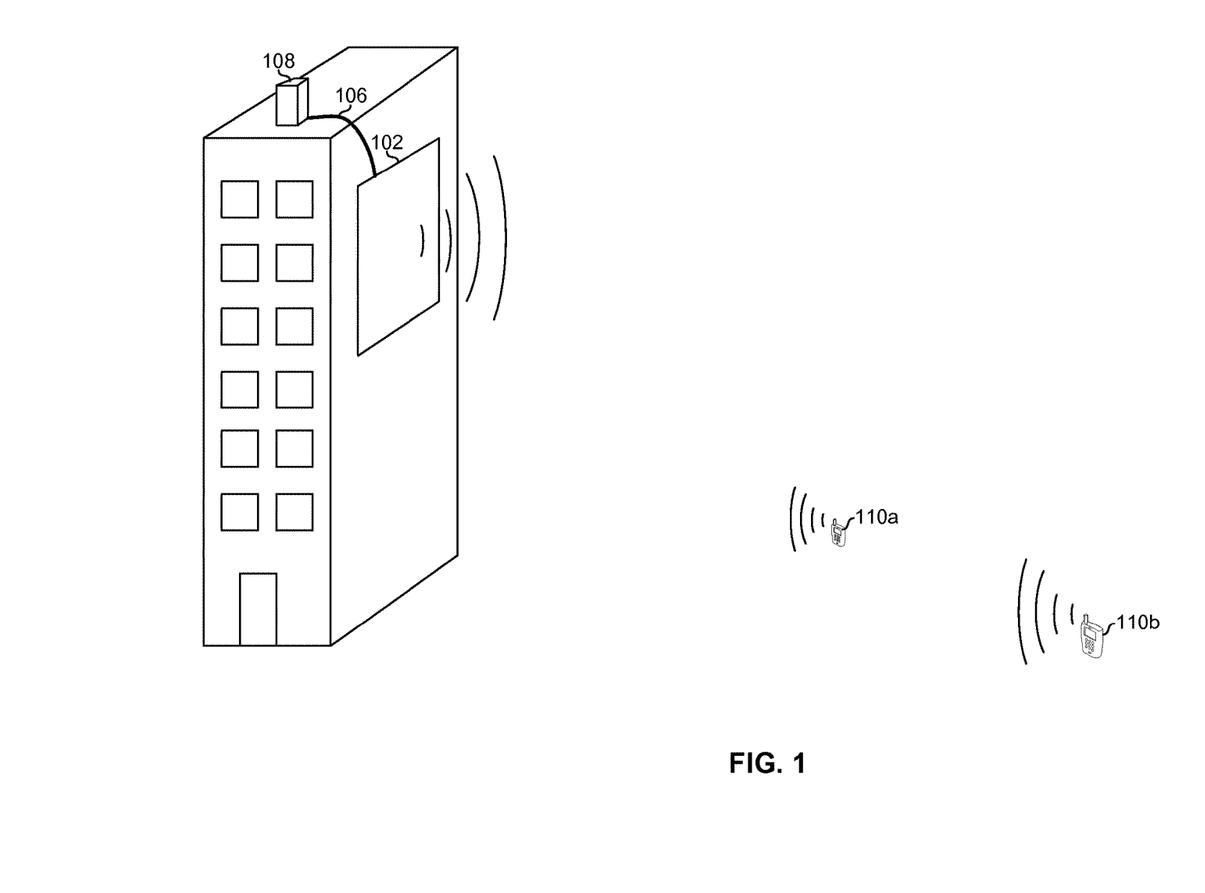
FIG. 1 depicts a large-scale transceiver array of a wireless access network.

FIG. 1 depicts a large-scale transceiver array of a wireless access network. The array 102 is mounted on a building and connected to a baseband unit 108 via one or more cables 106 (e.g., fiber optic cables, coaxial cables, or any other suitable type of cable). The array 102 communicates with mobile subscribers 110a and 110b.

Figure 2A:
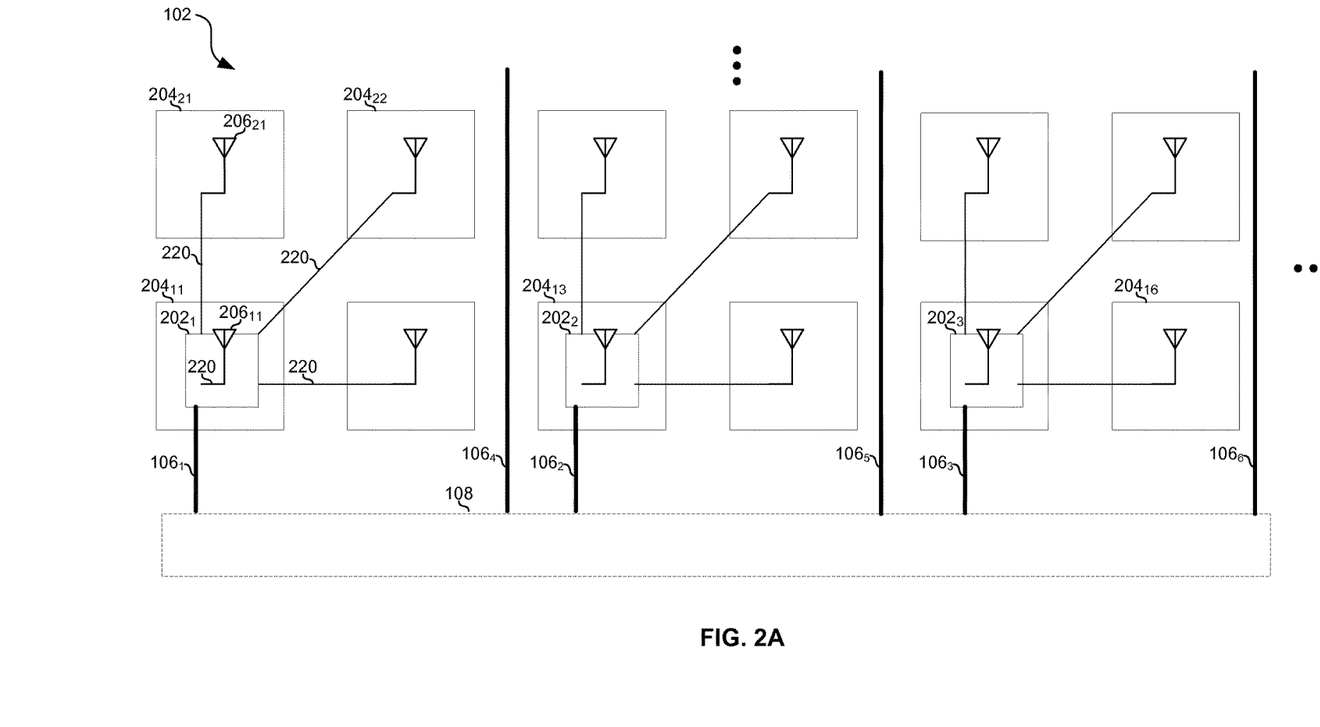
FIG. 2A depicts components of an example implementation of the large-scale transceiver array of FIG. 1.

FIG. 2A depicts components of an example implementation of the large-scale transceiver array of FIG. 1. The example array 102 in FIG. 2A comprises a plurality of modules 204 (any particular module 204 is called out as $204_{RC}$, where R and C are the module's row and column indexes, respectively). Although twelve modules are shown for illustration, an array 102 may comprise any number of modules (e.g., 32, 64, 128, or any other number).

The modules 204 may, for example, be installed in a manner similar to installing tiles. They may be laid out in a regular pattern and adhered to the wall using any suitable fastener such as glue, screws, etc.

Each of the modules 204 comprises an antenna element 206 (any particular antenna element 206 is called out as $206_{rc}$, where $1 \leq r \leq R$, $1 \leq c \leq C$, and R is the total number of rows in the array, and C is the total number of columns in the array). A subset of the modules 204 (e.g., every $N^{th}$ module, where N=4 in the example shown) comprise transceiver circuits 202 (any particular transceiver circuit 202 is called out as $202_x$, where $1 \leq x \leq X$ and X is the total number of transceivers in the array 102 (e.g., X=(R*C)/4 in the example of FIG. 2A).

Each of the transceiver circuit 202 transmits and receives via a respective subset of the antenna elements 206. In FIG. 2A, each transceiver circuit 202 is shown connected to its respective antenna elements 206 via links 220, which may be wired, optical fiber, and/or wireless links. In an example implementation, such wireless links may use broadband near-field communication (BNC) links as, for example, described in U.S. Patent Application Publication 20130210352 titled "Method and System For Broadband Near-Field Communication Utilizing Full Spectrum Capture (FSC) Supporting Ranging," which is hereby incorporated herein by reference.

In the example implementation of FIG. 2A, each of the transceivers circuits 202 is connected to the baseband unit 108 via a respective cable 106. Such an architecture may reduce the amount of data that each cable is required to carry but may also introduce a lot of complexity and cost. Accordingly, an alternative is shown in FIG. 2B in which only a subset of the transceivers 202 connect to the baseband unit and the remaining transceivers are connected in a daisy chain fashion via links 252.

Figure 2B:
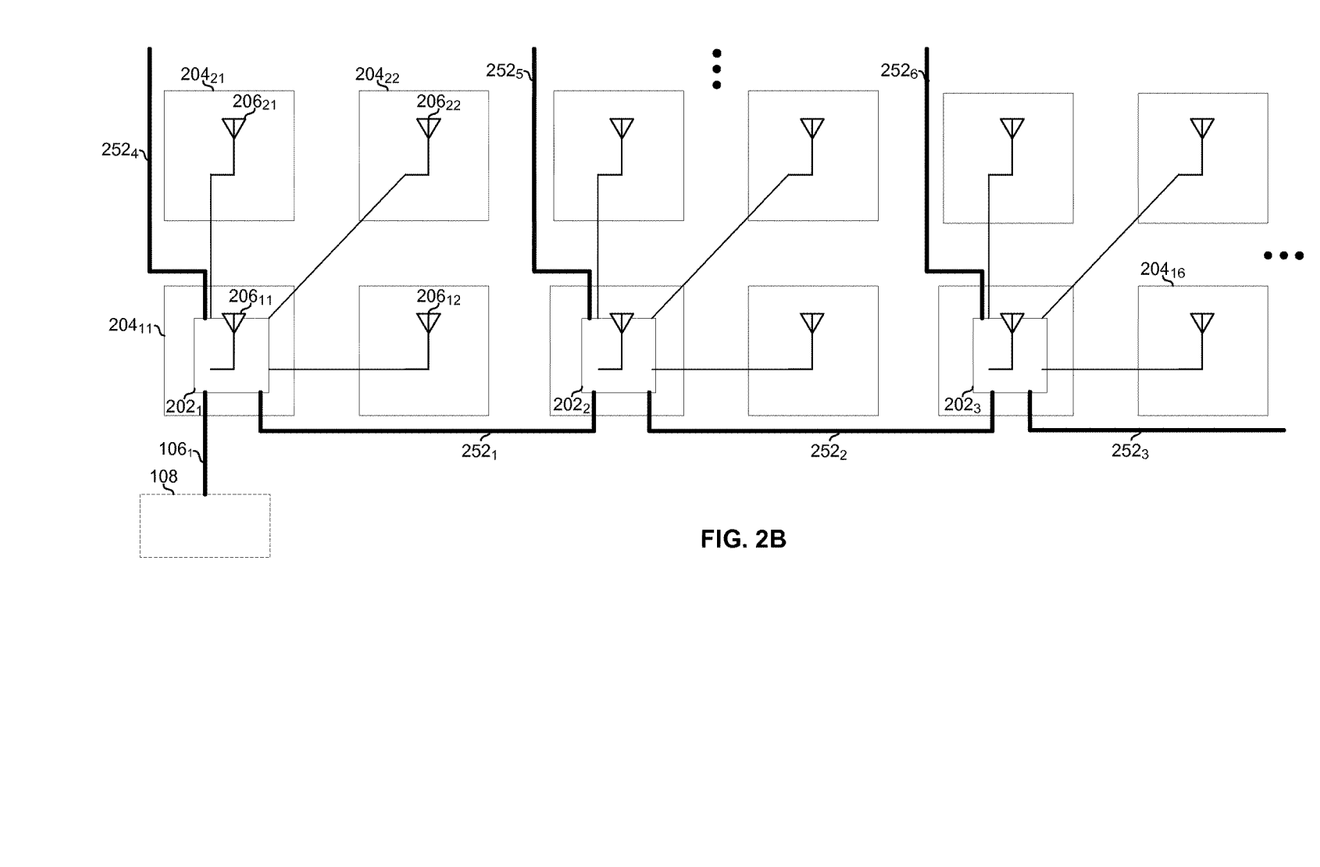
FIG. 2B depicts components of an example implementation of the large-scale transceiver array of FIG. 1.

The daisy chain arrangement of FIG. 2B has the drawback that a cable 106 has to carry traffic for multiple transceivers 202. This drawback, however, may be alleviated through the use of compression as, for example, described below with reference to FIGS. 5A-5C.

Figure 3A:
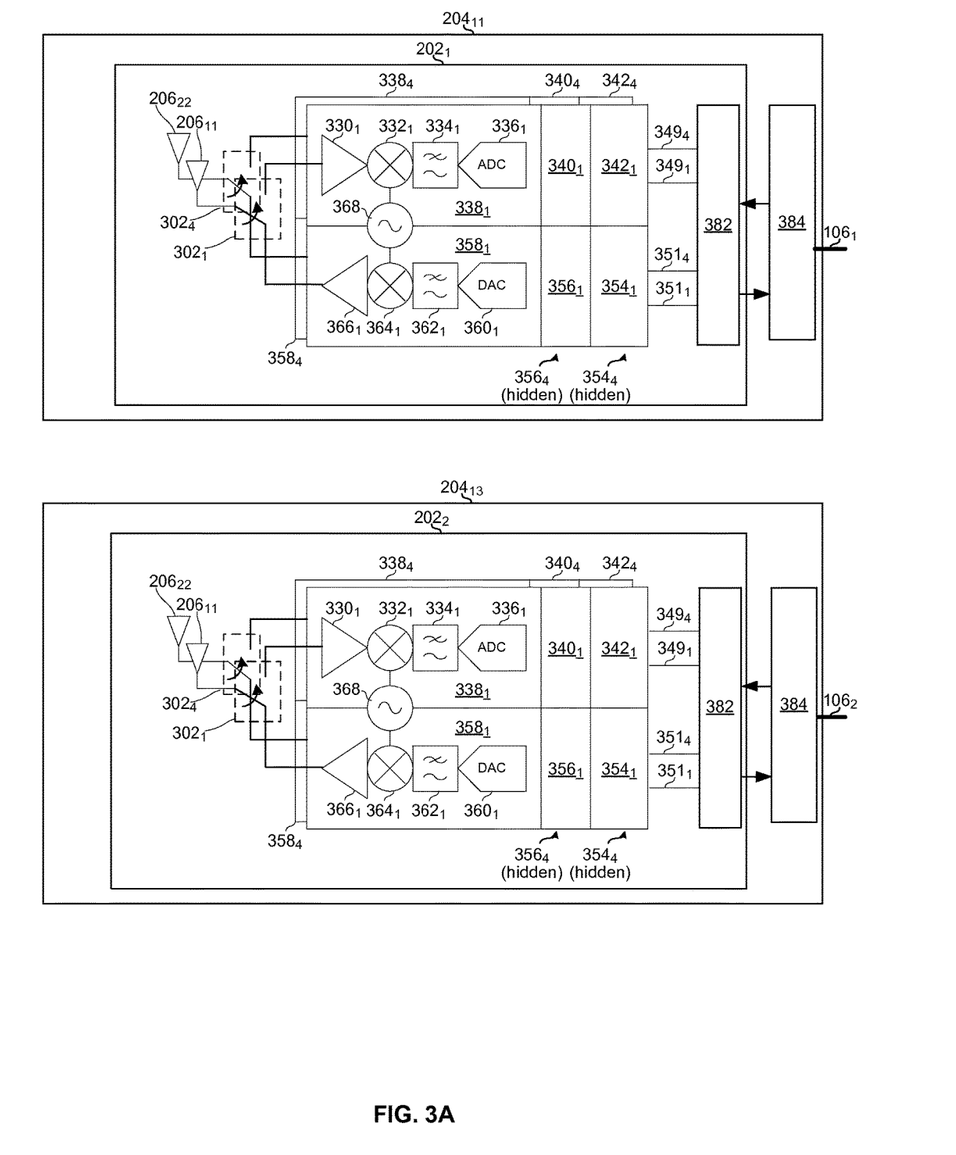
FIG. 3A depicts an example implementation of the transceiver-array modules of FIG. 2A.

FIG. 3A depicts an example implementation of the transceiver-array modules of FIG. 2A. For clarity of illustration, only two of the modules, $204_{11}$ and $204_{13}$ are shown. In the example implementation shown, each of the example modules 204 comprises four antennas 206, a transceiver circuit 202, and a circuit assembly 384. The circuit 202 may be a single integrated circuit die (e.g., CMOS). The circuit assembly 384 may comprise components which are undesirable to integrate on chip with the circuit 202. For example, for an implementation in which the links 106 are fiber optic cables, the circuit assembly 384 may comprise a laser diode and laser detector mounted on a PCB.

In the example implementation shown, each of the transceiver circuits 202 comprises transmit/receive switches $302_1$-$302_4$, receive analog front-end circuits $338_1$-$338_4$, receive digital signal processing circuits $340_1$-$340_4$, demodulator/decoder circuits $342_1$-$342_4$, interface 382, encoder/modulator circuits $354_1$-$354_4$, transmit digital signal processing circuits $356_1$-$356_4$, and transmit analog front-end circuits $358_1$-$358_4$.

Each of the transmit/receive switches 302 is configurable between a transmit configuration in which a respective transmit analog front-end 358 is connected to a respective antenna element 206 and a receive configuration in which a respective receive analog front-end 338 is connected to a respective antenna element 206. In practice, the switches 302 cannot provide perfect isolation. Consequently, even when a switch 302 is configured for transmit, some signal will leak through to the receive analog front end. As described below with reference to FIG. 4B, this leakage may be used for calibration of the transceiver array 102.

Each receiver analog front-end 338 comprises an amplifier 330, a mixer 332, a filter 334, and an analog-to-digital converter 336. The mixer 332 receives a local oscillator signal from local oscillator generator 368.

Each transmit analog front-end 358 comprises a digital to analog converter 360, a filter 362, a mixer 364, and a power amplifier 366. The mixer 364 receives a local oscillator signal from local oscillator generator 368.

In an example implementation, the receivers $338_1$-$338_4$ and transmitters $358_1$-$358_4$ are driven by a shared local oscillator generator 368. An example implementation of the local oscillator generator 368 is discussed below with reference to FIG. 3C.

Each of the receive digital signal processing circuits $340_1$-$340_4$ may be operable to, for example, perform digital beamforming, filtering, calibration (e.g., calibration of in-phase and quadrature phase signal paths), and/or the like.

Each transmit digital signal processing circuits 356 may be operable to, for example, perform digital beamforming, power amplifier linearization, calibration, and/or other digital front end functions.

Each demodulator/decoder 342 is operable to demodulate received signals in accordance with modulation schemes used for the access network in which array 102 participates, and decode received signals in accordance with FEC algorithms schemes used for the access network in which array 102 participates.

Each encoder/modulator 354 is operable to modulate signals to be transmitted in accordance with modulation schemes used for the access network in which array 102 participates, and encode signals to be transmitted in accordance with FEC algorithms used for the access network in which array 102 participates.

The interface circuit 382 is operable to transmit and receive in accordance with protocols in use on the link 106. In an example implementation where the link 106 is a fiber optic cable, the interface 382 may be operable to demodulate the signal received from the laser detector and modulate a signal for output to the laser diode.

In another example implementation, some of the circuitry shown in circuits 202 may instead be implemented in the baseband unit 108. For example, modulation, demodulation, FEC encoding, and FEC decoding may be done in the baseband unit 108. This may reduce the complexity of the circuit 202 at the expense of increasing the amount of data that needs to be delivered over links 106. As another example, demodulation, which may be relatively less memory/processor intensive than decoding, may be performed in the circuit 202 to output LLRs to the baseband unit 108 where the relatively-more memory/processor intensive decoding may take place.

Figure 3B:
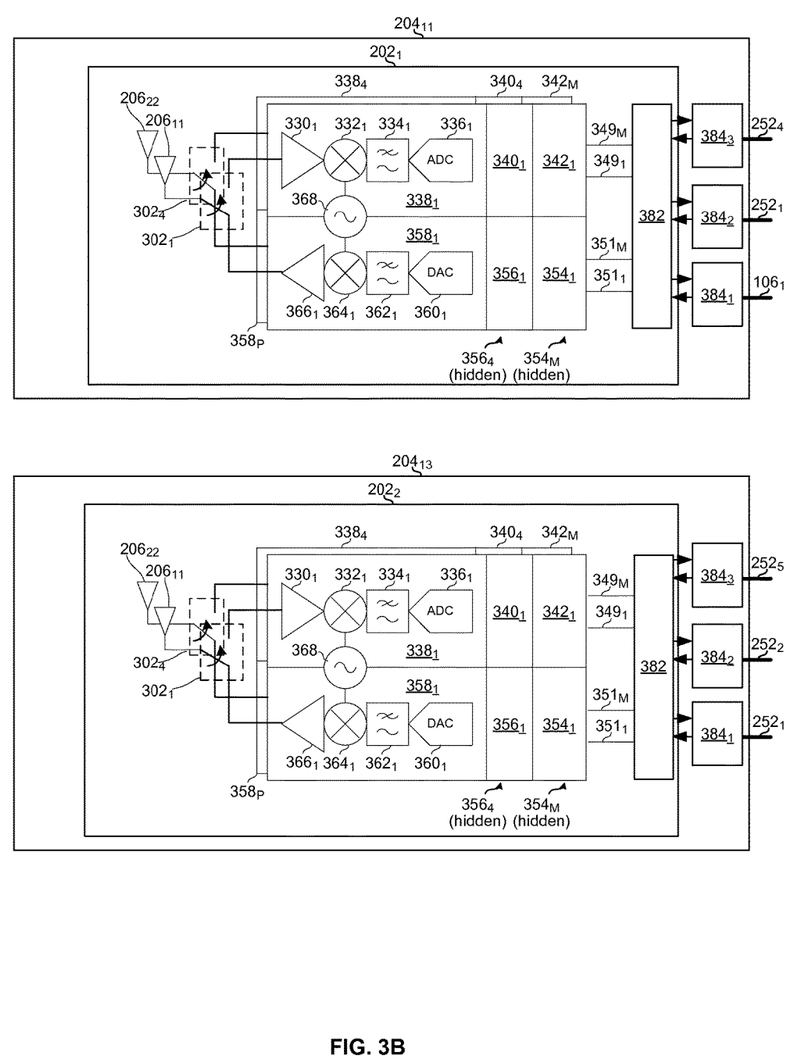
FIG. 3B depicts an example implementation of the transceiver-array modules of FIG. 2B.

FIG. 3B depicts an example implementation of the transceiver-array modules of FIG. 2B. The implementation of the modules 204 in FIG. 3B are the same as in FIG. 3A except each comprises a plurality (three in the example shown) of instances of the circuit assembly 384 for supporting daisy chaining between modules 204. Attendant with this is that, in FIG. 3B, the interface 382 is operable to support the routing/forwarding of data among links 106 and 252.

Figure 3C:
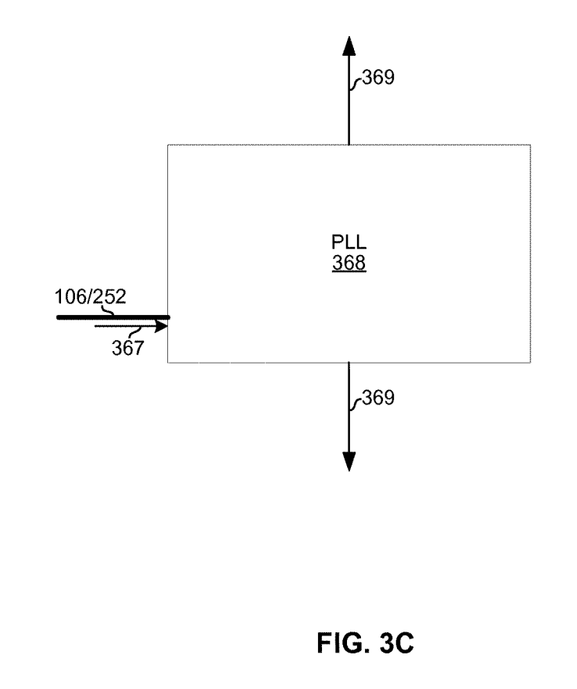
FIG. 3C depicts an example implementation in which a local oscillator generator of a transceiver array comprises a phase locked loop (PLL).

FIG. 3C depicts an example implementation in which the local oscillator generator 368 comprises a phase locked loop (PLL). A reference signal 367 is received via the link 106 or 252. The PLL 368 generates signal 369 that is locked to the phase of the signal 367. In an example implementation, the PLL 368 may be an integer-N PLL and the frequency of signal 369 may be an integer amount, N, times higher than the frequency of the signal 367. Use of an integer-N PLL may allow the transceivers to synchronize without phase-drifting relative to each other, as may happen with a fractional-N PLL.

Figure 4A:
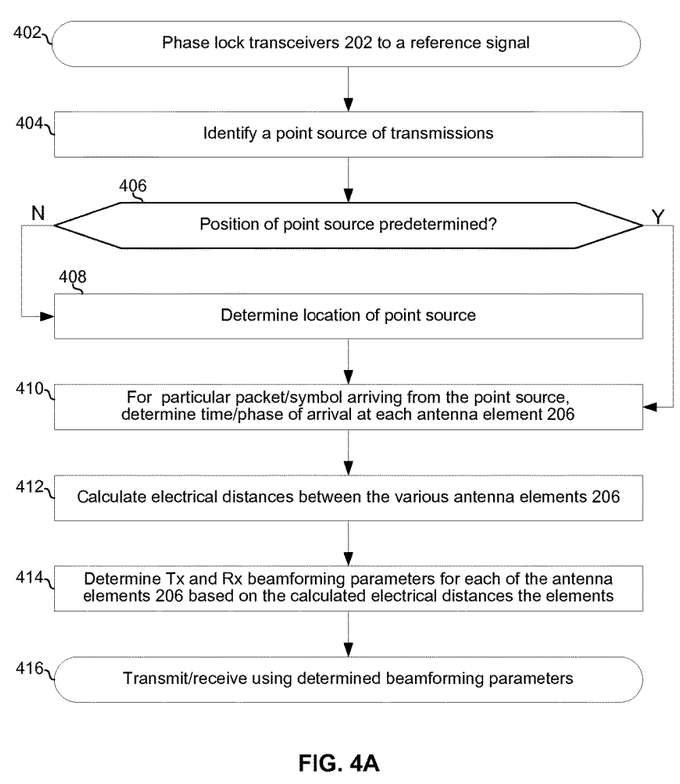
FIG. 4A is a flowchart illustrating an example process for calibration of a large-scale transceiver array.

FIG. 4A is a flowchart illustrating an example process for calibration of a large-scale transceiver array. In block 402, the transceivers 202 of the array 102 achieve phase lock. For example, a low frequency (e.g., 10 MHz) reference signal (e.g., 367 of FIG. 3C) may be distributed among the transceivers and each of the transceivers 202 may lock to the phase of the reference signal. Other frequencies may of course be used depending on characteristics of the system such as array size, printed circuit board design, and performance requirements. In block 404, the array 102 identifies a point source of a transmission. In block 406, if the location of the point source is not known (e.g., it is an arbitrarily selected mobile subscriber 102), then the process advances to block 408 in which the location of the point source is determined (e.g., based on location information (such as GPS coordinates) in the system, measured angle of arrival of the signal, and/or the like) and the process then advances to block 410. Returning to block 406, if the location of the point source is known (e.g., it is a fixed point source installed by the operator of the array 102), then the process advances to block 410. In block 410, for a particular packet/symbol arriving from the point source, phase/time of arrival at each antenna element 206 is determined. In block 412, the electrical distances between the various antenna elements 206 of the array are determined based on time/phase of arrival at each antenna element 206. In block 414, Tx and/or Rx beamforming parameters for the antenna elements 206 are determined based on the calculated electrical distances between the antenna elements. In an example implementation, the parameters may comprise a complex coefficient per antenna element and frequency band (e.g., for transmission/reception on two bands, two complex coefficients may be generated for each antenna element 206). The beamforming parameters may update slowly relative to the data rate (e.g., once per 10 or 100 milliseconds). In block 416, the determined beamforming parameters are used for transmission and/or reception. For reception, the baseband unit, or the receive digital signal processing circuits $340_1$-$340_4$, may apply the determined beamforming coefficients to signals from the receive analog front ends $338_1$-$338_4$. For transmission, the baseband unit, or the transmit digital signal processing circuits 356, may apply the determined beamforming coefficients prior to outputting signals to be transmitted to the transmit analog front ends $358_1$-$358_4$. In addition to accounting for the electrical distances between antenna elements 206, the beamforming coefficients may also compensate for differences in electrical distances within the circuits 202, which may be known by design.

Figure 4B:
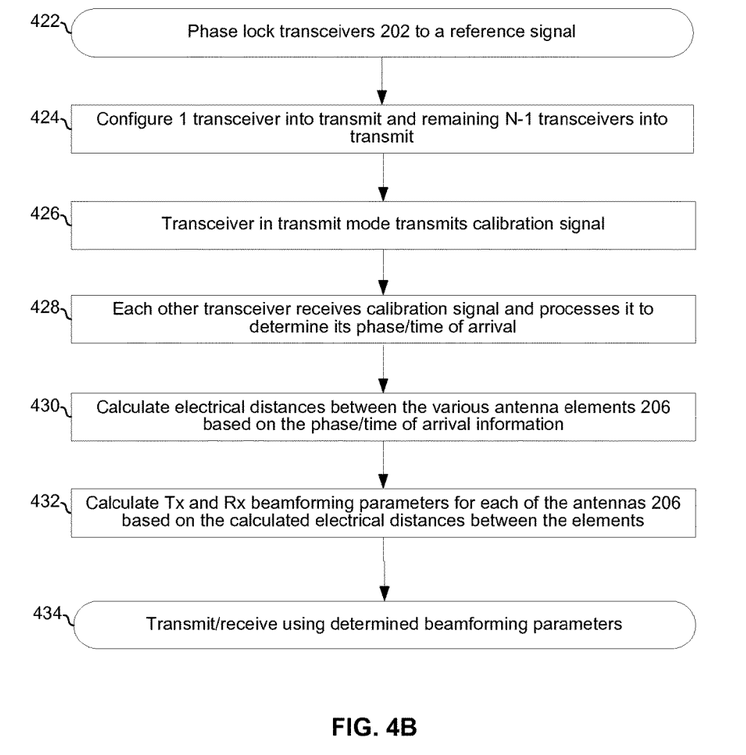
FIG. 4B is a flowchart illustrating another example process for calibration of a large-scale transceiver array.

FIG. 4B is a flowchart illustrating another example process for calibration of a large-scale transceiver array. In block 422, the transceivers 202 of the array 102 achieve phase lock (e.g., to signal 367). In block 424, one of the transceivers 202 (e.g., $202_2$) is configured into transmit mode (i.e., its transmitter components are powered up and its switches 302 are configured for transmit) and the remaining transceivers (e.g., $202_1$ and $202_3$) are configured into receive mode (i.e., their receive components are powered up and their switches 302 are configured for receive). In block 426, the transceiver configured into transmit mode transmits a calibration signal. The calibration signal may be, for example, a very low-power broadband (possibly including frequencies in the band used for normal communications by the array 102) or single tone signal. The signal may low enough in power to comply with applicable regulatory limits such that there is no need to check for spectrum availability and no fear of interfering with other transmissions. The very low power may be usable for the calibration because of the close proximity of the antennas 206 (or at least close proximity of subsets of the antennas 206, where calibration proceeds subset by subset of antennas). In block 428, each transceiver configured into receive mode receives the calibration signal and processes it to determine its phase/time of arrival. In block 430, electrical distances between the various antenna elements 206 are calculated based on the phase/time of arrival of the calibration signal. In block 432, Tx and/or Rx beamforming parameters for the antenna elements 206 are determined based on the calculated electrical distances between the antenna elements. In block 434, the determined beamforming parameters are used for transmission and/or reception. For reception, the baseband unit, or the receive digital signal processing circuits $340_1$-$340_4$, may apply the determined beamforming coefficients to signals from the receive analog front ends $338_1$-$338_4$. For transmission, the baseband unit, or the transmit digital signal processing circuits 356, may apply the determined beamforming coefficients prior to outputting signals to be transmitted to the transmit analog front ends $358_1$-$358_4$. In addition to accounting for the electrical distances between antenna elements 206, the beamforming coefficients may also compensate for differences in electrical distances within the circuits 202, which may be known by design.

Figure 4C:
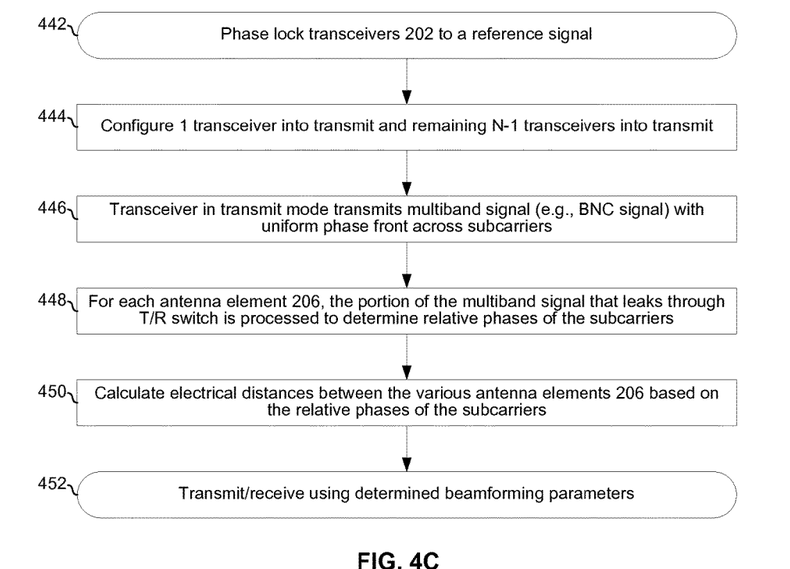
FIG. 4C is a flowchart illustrating another example process for calibration of a large-scale transceiver array.

FIG. 4C is a flowchart illustrating another example process for calibration of a large-scale transceiver array. In block 442, the transceivers 202 of the array 102 achieve phase lock. In block 444, one of the transceivers 202 (e.g., $202_2$) is configured into transmit mode (i.e., its transmitter components are powered up and its switches 302 are configured for transmit) and the remaining transceivers (e.g., $202_1$ and $202_3$) are configured into receive mode (i.e., their receive components are powered up and their switches 302 are configured for receive). In block 446, the transceiver configured into transmit mode transmits a multiband signal (e.g., a broadband near-field communication signal) having a uniform phase across all the subcarriers of the calibration signal. In block 448, for each antenna element 206, the portion of the calibration signal that leaks through T/R switch is processed to determine relative phases of the subcarriers of the received signal. In block 450, electrical distances between the various antenna elements 206 is calculated based on the relative phases of the subcarriers. In block 452, the determined beamforming parameters are used for transmission and/or reception. For reception, the baseband unit 108 may apply the determined beamforming coefficients to signals from the array 102. For transmission, the baseband unit 108 may apply the determined beamforming coefficients prior to outputting signals to be transmitted to the array 102. In addition to accounting for the electrical distances between antenna elements 206, the beamforming coefficients may also compensate for differences in electrical distances within the circuits 202, which may be known by design.

Figure 4D:
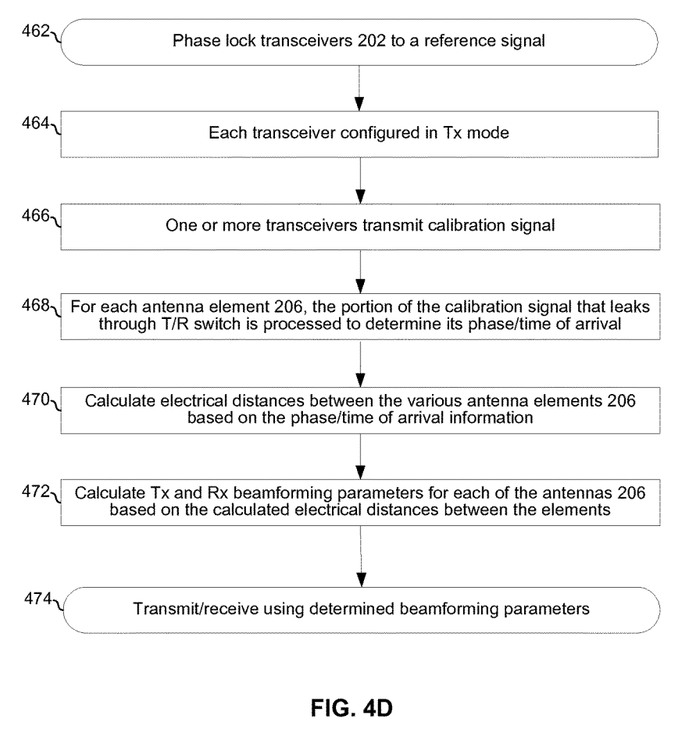
FIG. 4D is a flowchart illustrating another example process for calibration of a large-scale transceiver array.

FIG. 4D is a flowchart illustrating another example process for calibration of a large-scale transceiver array. In block 462, the transceivers 202 of the array 102 achieve phase lock. In block 464, each of the transceivers 202 is configured to concurrently transmit and receive (i.e., both transmit and receive circuitry is powered up/initialized/etc.) but with its T/R switch 302 configured for transmit. In block 466, one or more of the transceiver 202 transmits a calibration signal. Where multiple transceivers transmit a calibration signal, they may do so in-turn or concurrently. For example, different subsets of transceivers may transmit their calibration signals at different times but with each transceiver in a particular subset transmitting at the same time. In block 468, for each antenna element 206, the portion of the calibration signal that leaks through T/R switch 302 is processed the corresponding receive circuitry to determine its phase/time of arrival. In this regard, due to the fact that very low throughput is suitable for the calibration, the signal that leaks through the switch 302 which is configured in the transmit position may be sufficient for calibration purposes. Averaging over a determine time period, use of a very wide bandwidth calibration signal, and/or other techniques may be used to recover information from the calibration signal leaking through a switch 302 configured for transmit. In block 470, electrical distances between the various antenna elements 206 are calculated based on the phase/time of arrival of the calibration signal. In block 472, Tx and/or Rx beamforming parameters for the antenna elements 206 are determined based on the calculated electrical distances between the antenna elements. In block 474, the determined beamforming parameters are used for transmission and/or reception. For reception, the baseband unit, or the receive digital signal processing circuits $340_1$-$340_4$, may apply the determined beamforming coefficients to signals from the receive analog front ends $338_1$-$338_4$. For transmission, the baseband unit, or the transmit digital signal processing circuits 356, may apply the determined beamforming coefficients prior to outputting signals to be transmitted to the transmit analog front ends $358_1$-$358_4$. In addition to accounting for the electrical distances between antenna elements 206, the beamforming coefficients may also compensate for differences in electrical distances within the circuits 202, which may be known by design.

Figure 5A:
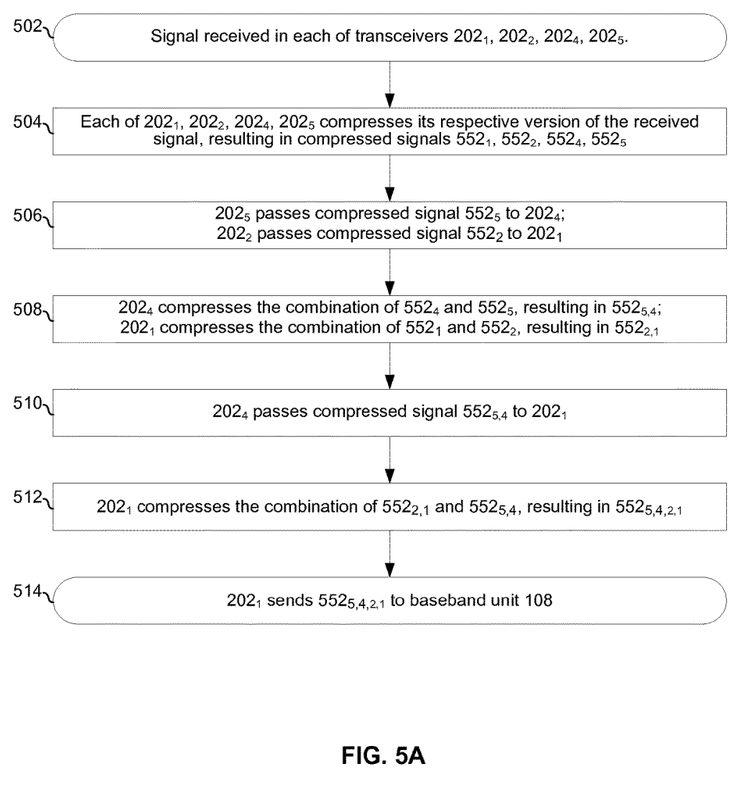
FIG. 5A is a flowchart illustrating an example process for reception via a large-scale transceiver array.

FIG. 5A is a flowchart illustrating an example process for reception via a large-scale transceiver array. The process of FIG. 5A is described with reference to the simplified diagram of a transceiver array 102 shown in FIG. 5C. In block 502, a signal is received in each of transceivers $202_1$, $202_2$, $202_4$, and $202_5$ via their respective antenna elements 206. In block 504, each of transceivers $202_1$, $202_2$, $202_4$, $202_5$ compresses its respective version of the received signal, resulting in compressed signals $552_1$, $552_2$, $552_4$, $552_5$. Because the different versions of the same received signal are highly correlated, high levels of compression may be achieved. In block 506, transceiver $202_5$ passes compressed signal $552_5$ to transceiver $202_4$, and transceiver $202_2$ passes compressed signal $552_2$ to transceiver $202_1$. In block 508, transceiver $202_4$ compresses the combination of $552_4$ and $552_5$, resulting in $552_{5,4}$, and $202_1$ compresses the combination of $552_1$ and $552_2$, resulting in $552_{2,1}$. In block 510, transceiver $202_4$ passes compressed signal $552_{5,4}$ to transceiver $202_1$. In block 512, $202_1$ compresses the combination of $552_{2,1}$ and $552_{5,4}$, resulting in $552_{5,4,2,1}$. In block 514, $202_1$ sends $552_{5,4,2,1}$ to baseband unit 108.

Figure 5B:
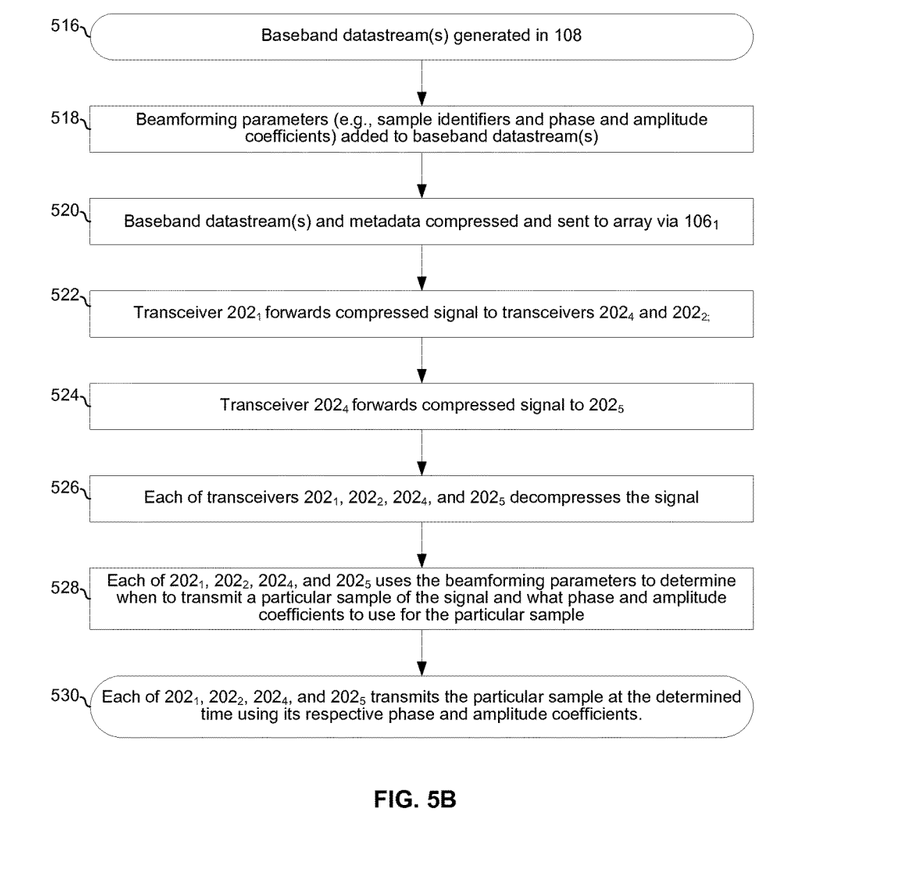
FIG. 5B is a flowchart illustrating an example process for transmission via a large-scale transceiver array.
Figure 5C:
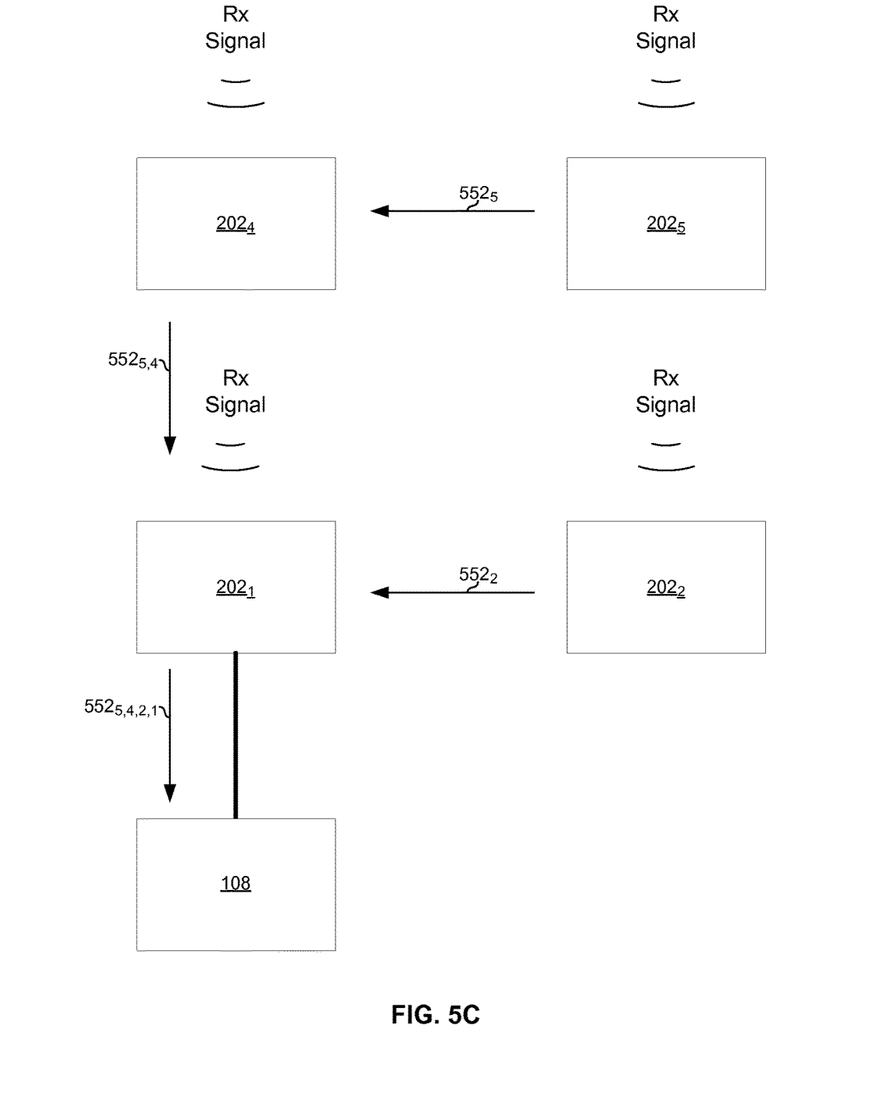
FIG. 5C is a diagram of a simplified large-scale transceiver array.

FIG. 5B is a flowchart illustrating an example process for transmission via a large-scale transceiver array. The process of FIG. 5B is described with reference to the simplified diagram of a transceiver array 102 shown in FIG. 5C. In block 516, one or more baseband datastreams are generated in baseband unit 108. In block 518, beamforming parameters (e.g., one complex coefficient for each transmit path/antenna element 206) determined for the array to be used for transmission are added to the baseband datastream(s) (e.g., as metadata, in packet headers, etc.). In block 520, the baseband datastream(s) and metadata are compressed and sent to the transceiver $202_1$ onto the link $106_1$. In block 522, the transceiver $202_1$ receives the compressed signal and forwards it to transceivers $202_2$ and $202_4$. In block 524, the transceiver $202_4$ forwards the compressed signal to $202_5$. In block 526, each of transceivers $202_1$, $202_2$, $202_4$, and $202_5$ decompresses the signal. In block 528, the transceivers $202_1$, $202_2$, $202_4$, and $202_5$ use the beamforming parameters to adjust phase and amplitude of the signal to be transmitted via each antenna element 506 and to determine when to transmit the particular samples (i.e., to coordinate that, at any particular time, each transceiver is transmitting its respective version of the same particular sample(s)).

In accordance with an example implementation of this disclosure, circuitry may be distributed across a plurality of modules (e.g., modules 204), each of the modules comprising a respective one of a plurality of antenna elements (e.g., 206), and each of a subset of the plurality of modules comprising a respective one of a plurality of transceivers (e.g., 202), wherein the plurality of modules are communicatively coupled via one or more communication links (e.g., 106, 220, and/or 252). The circuitry may be operable to receive a calibration signal via the plurality of antenna elements, determine, for each one of the antenna elements, a time and/or phase of arrival of the calibration signal, calculate, based on the time and/or phase of arrival of the calibration signal at each of the plurality of antenna elements, electrical distances between the plurality of antenna elements on the one or more communication links, and calculate beamforming coefficients for use with the plurality of antenna elements based on the electrical distances. The calibration signal may be a signal from a mobile terminal (e.g., 110a) in a coverage area served by the plurality of modules. Each of the transceivers may configurable into a transmit mode and a receive mode The calibration signal may be transmitted by a first one of the transceivers configured in the transmit mode while one or more others of the transceivers is configured in the receive mode. Each of the transceivers comprises a switch (e.g., 302) which, in a transmit configuration, couples a transmitter of the transceiver to a respective one of the plurality of antenna elements and, in a receive configuration, couples a receiver of the transceiver to the respective one of the plurality of antenna elements. The switch allows a certain amount of leakage from the antenna element to a receiver of the transceiver even when the switch is configured in the transmit configuration. For one or more of the receivers, the reception of the calibration signal may be via a respective one of the switches configured in the transmit configuration. The calibration signal may comprise a plurality of carriers, with each of the carriers having a center frequency that is different than the center frequency of each other of the carriers, and each of the carriers being transmitted with the same phase. A phase-lock signal (e.g., 367) may be distributed among the plurality of transceivers via the one or more communication links, and each of the transceivers may be operable to lock a phase of its local oscillator (e.g., 368) to the phase-lock signal. The one or more communication links may be fiber optic cables. Each of the transceivers may be an integrated circuit on a single semiconductor die (e.g., CMOS) and may comprise circuitry operable to interface to an external laser diode for transmission onto the one or more communication links and to an external laser detector for reception of signals via the one or more fiber optic cables. Each of the transceivers may comprise a modulator and a demodulator. Each of the transceivers may comprise a forward error correction encoder and a forward error correction decoder. Each of the transceivers may be operable to: receive, via the one or more communication links, a compressed signal to be transmitted; decompress the signal to be transmitted to generate a decompressed signal; and transmit the decompressed signal via a corresponding one or more of the plurality of antennas. Each of the plurality of modules may be configured to be wall-mounted. The system may comprise a baseband unit coupled to the plurality of transceivers via the one or more communication links. Each of the transceivers may comprise a demodulator and the baseband unit may comprise a forward error correction decoder such that soft decisions of the demodulator are communicated over the one or more communication links for decoding in the baseband unit. The one or more communication links may be wireless links. The calibration signal may be a spread spectrum signal.

In accordance with an example implementation of this disclosure, one or more of the transceivers (e.g., $202_5$) may be operable to: receive, via a first one or more of the plurality of antenna elements, a respective first one or more versions of a signal incident on the plurality of antennas; perform beamforming processing on the first one or more versions of the signal to generate a first beamformed signal; compress the first beamformed signal to generate a first compressed signal (e.g., $552_5$); and transmit the first compressed signal onto the one or more communication links. One or more of the transceivers (e.g., $202_4$) may be operable to: receive, via a second one or more of the plurality of antenna elements, a respective second one or more versions of the signal incident on the plurality of antennas; perform beamforming processing on the second one or more versions of the signal to generate a second beamformed signal; compress the second beamformed signal to generate a second compressed signal; receive the first compressed signal via the one or more communication links; compress the first compressed signal and the second compressed signal to generate a third compressed signal (e.g., $552_{5,4}$); and transmit the third compressed signal onto the one or more communication links.

In accordance with an example implementation of this disclosure, each one of the transceivers may be operable to: receive, via the one or more communication links, a datastream to be transmitted; receive, via the one or more communication links, a plurality of beamforming coefficients to be used for transmission of the datastream; select one or more of the plurality of beamforming coefficients corresponding to the one of the transceivers; and apply the selected one or more beamforming coefficients. Each one of the transceivers may be operable to: receive, via the one or more communication links, a plurality of beamforming coefficients to be used for reception of a signals via a corresponding one or more the plurality of antenna elements; select one or more of the plurality of beamforming coefficients corresponding to the one of the transceivers; and apply the selected one or more beamforming coefficients to signals received via the corresponding one or more of the plurality of antenna elements.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What is claimed is:

1. A system comprising:
a plurality of modules, each of said modules comprising a respective one of a plurality of antenna elements, and each of a subset of said plurality of modules comprising a respective one of a plurality of transceivers, wherein:
said plurality of modules are communicatively coupled via one or more communication links; and
one or more of said plurality of transceivers are operable to:
receive a calibration signal via said plurality of antenna elements;
determine, for each one of said antenna elements, a time and/or phase of arrival of said calibration signal;
calculate, based on said time and/or phase of arrival of said calibration signal at each of said plurality of antenna elements, electrical distances between said plurality of antenna elements on said one or more communication links; and
calculate beamforming coefficients for use with said plurality of antenna elements based on said electrical distances.

2. The system of claim 1, wherein said calibration signal is a signal from a mobile terminal in a coverage area served by said plurality of modules.

3. The system of claim 1, wherein:
each of said transceivers is configurable into a transmit mode and a receive mode; and
said calibration signal is transmitted by a first one of said transceivers configured in said transmit mode while one or more others of said transceivers is configured in said receive mode.

4. The system of claim 1, wherein:
each of said transceivers comprises a switch which, in a transmit configuration, couples a transmitter of said transceiver to a respective one of said plurality of antenna elements and, in a receive configuration, couples a receiver of said transceiver to said respective one of said plurality of antenna elements;
said switch allows a certain amount of leakage from said antenna element to the receiver of said transceiver even when said switch is configured in said transmit configuration;
for one or more of said receivers, said reception of said calibration signal is via a respective one of said switches configured in said transmit configuration.

5. The system of claim 1, wherein:
said calibration signal comprises a plurality of carriers;
each of said carriers has a center frequency that is different than the center frequency of each other of said carriers; and
each of said carriers is transmitted with the same phase.

6. The system of claim 1, wherein:
a phase-lock signal is distributed among said plurality of transceivers via said one or more communication links; and
each of said transceivers is operable to lock a phase of its local oscillator to said phase-lock signal.

7. The system of claim 1, wherein one or more of said transceivers is operable to:
- receive, via a first one or more of said plurality of antenna elements, a respective first one or more versions of a signal incident on said plurality of antennas;
- perform beamforming processing on said first one or more versions of said signal to generate a first beamformed signal;
- compress said first beamformed signal to generate a first compressed signal; and
- transmit said first compressed signal onto said one or more communication links.

8. The system of claim 7, wherein one or more of said transceivers is operable to:
- receive, via a second one or more of said plurality of antenna elements, a respective second one or more versions of said signal incident on said plurality of antennas;
- perform beamforming processing on said second one or more versions of said signal to generate a second beamformed signal;
- compress said second beamformed signal to generate a second compressed signal;
- receive said first compressed signal via said one or more communication links;
- compress said first compressed signal and said second compressed signal to generate a third compressed signal; and
- transmit said third compressed signal onto said one or more communication links.

9. The system of claim 1, wherein each one of said transceivers is operable to:
- receive, via said one or more communication links, a datastream to be transmitted;
- receive, via said one or more communication links, a plurality of beamforming coefficients to be used for transmission of said datastream;
- select one or more of said plurality of beamforming coefficients corresponding to said each one of said transceivers;
- apply said selected one or more beamforming coefficients.

10. The system of claim 1, wherein each one of said transceivers is operable to:
- receive, via said one or more communication links, a plurality of beamforming coefficients to be used for reception of a signals via a corresponding one or more said plurality of antenna elements;
- select one or more of said plurality of beamforming coefficients corresponding to said one of said transceivers;
- apply said selected one or more beamforming coefficients to signals received via said corresponding one or more of said plurality of antenna elements.

11. The system of claim 1, wherein said one or more communication links are fiber optic cables.

12. The system of claim 11, wherein each of said transceivers is an integrated circuit on a single semiconductor die and comprises circuitry operable to interface to an external laser diode for transmission onto said one or more communication links and to an external laser detector for reception of signals via said one or more fiber optic cables.

13. The system of claim 1, wherein each of said transceivers comprises a modulator and a demodulator.

14. The system of claim 13, wherein each of said transceivers comprises a forward error correction encoder and a forward error correction decoder.

15. The system of claim 1, wherein each one of said transceivers is operable to:
- receive, via said one or more communication links, a compressed signal to be transmitted;
- decompress said signal to be transmitted to generate a decompressed signal;
- transmit said decompressed signal via a corresponding one or more of said plurality of antennas.

16. The system of claim 1, wherein each of said plurality of modules is configured to be wall-mounted.

17. The system of claim 1, comprising a baseband unit coupled to said plurality of transceivers via said one or more communication links.

18. The system of claim 1, wherein:
- each of said transceivers comprises a demodulator and a baseband unit comprises a forward error correction decoder; and
- soft decisions of said demodulator are communicated over said one or more communication links for decoding in said baseband unit.

19. The system of claim 1, wherein said one or more communication links are wireless links.

20. The system of claim 1, wherein said calibration signal is a spread spectrum signal.

* * * * *